March 20, 1956          C. AGOTAI          2,738,982

PERAMBULATORS HAVING MOVABLE RUNNING GEAR

Filed Sept. 30, 1954          3 Sheets-Sheet 1

INVENTOR.
Carlos Agotai
BY
Michael S. Striker
agt.

March 20, 1956 — C. AGOTAI — 2,738,982
PERAMBULATORS HAVING MOVABLE RUNNING GEAR
Filed Sept. 30, 1954 — 3 Sheets-Sheet 2

INVENTOR.
Carlos Agotai
BY
Michael S. Striker
agt.

March 20, 1956  C. AGOTAI  2,738,982
PERAMBULATORS HAVING MOVABLE RUNNING GEAR
Filed Sept. 30, 1954  3 Sheets-Sheet 3

INVENTOR.
Carlos Agotai
BY
Michael S. Striker
agt.

United States Patent Office 2,738,982
Patented Mar. 20, 1956

2,738,982

PERAMBULATORS HAVING MOVABLE RUNNING GEAR

Carlos Agotai, Buenos Aires, Argentina, assignor to John Adler, Philadelphia, Pa.

Application September 30, 1954, Serial No. 459,395

4 Claims. (Cl. 280—5.28)

The present invention relates to perambulators.

This application is a continuation-in-part of my co-pending application Serial No. 110,058, filed August 13, 1949, and entitled "Babies' Perambulators," now abandoned.

When moving known perambulators over irregular surfaces such as stairs or into and out of an automobile, considerable difficulty and trouble is involved in maneuvering the perambulator. The same is true when executing turns with known perambulators.

One of the objects of the present invention is to provide a perambulator which is very easy to maneuver up and down stairs, into and out of an automobile, and under similar situations.

Also, it is an object of the present invention to provide a perambulator which is easy to steer.

Furthermore, it is an object of the present invention to provide a perambulator whose wheels are supported in such a way that these wheels automatically adapt themselves to irregular surfaces such as the surface of the stairs and the like.

Also, it is an object of the present invention to provide a perambulator whose wheels may be set very easily either close to or distant from the frame of the perambulator.

With the above objects in view the present invention mainly consists of a perambulator which includes a frame and a first pair of laterally spaced wheels turnably carried by the frame adjacent one end thereof. A second pair of laterally spaced wheels are located adjacent the other end of the frame, and a means supports the second pair of wheels on the frame for movement toward and away from the first pair of wheels. A spring means is carried by the frame and engages the support means to urge the second pair of wheels to a predetermined position away from the first pair of wheels so that when moving the perambulator on stairs or the like the second pair of wheels may be periodically moved against the force of the spring means toward the first pair of wheels and then may be released for movement under the action of the spring means back to the predetermined position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
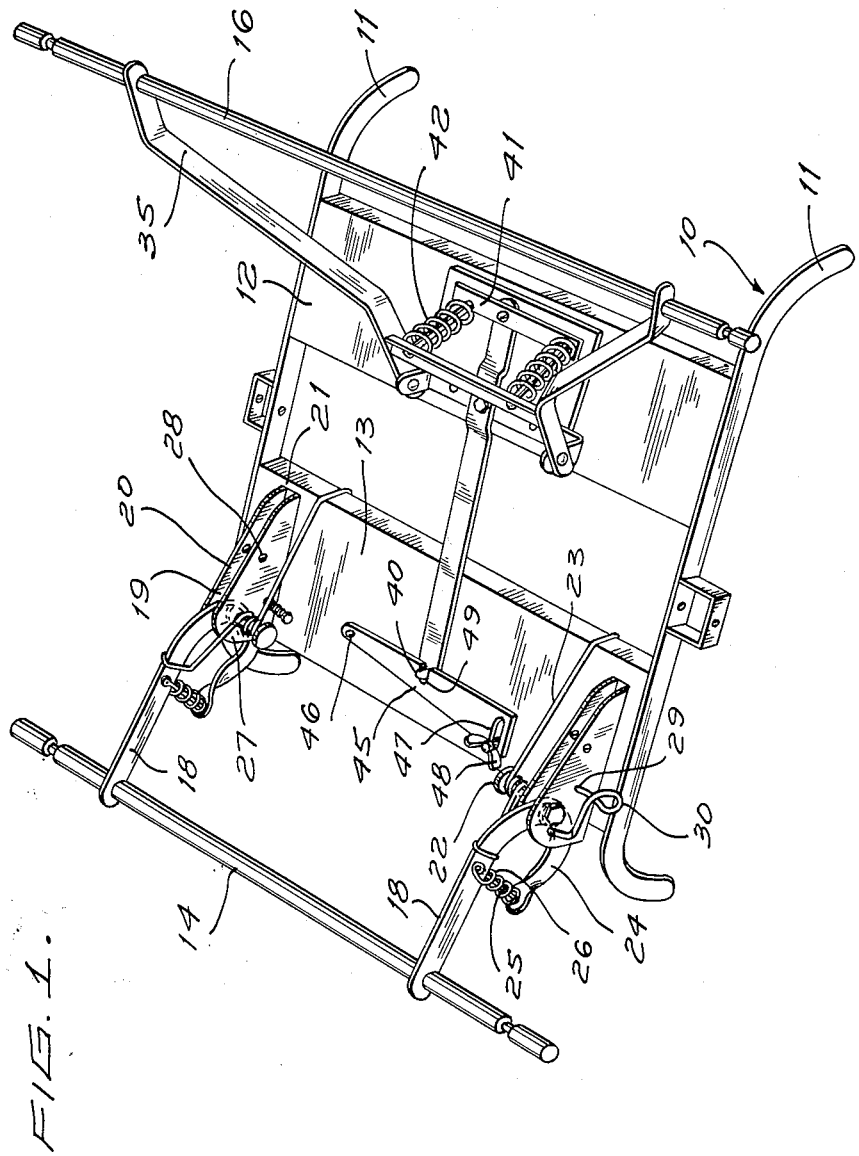
Fig. 1 is a perspective view of the structure attached to the underside of the frame of the perambulator constructed in accordance with the present invention, this frame being shown inverted in Fig. 1 and the wheels being omitted from Fig. 1.
Figure 5:
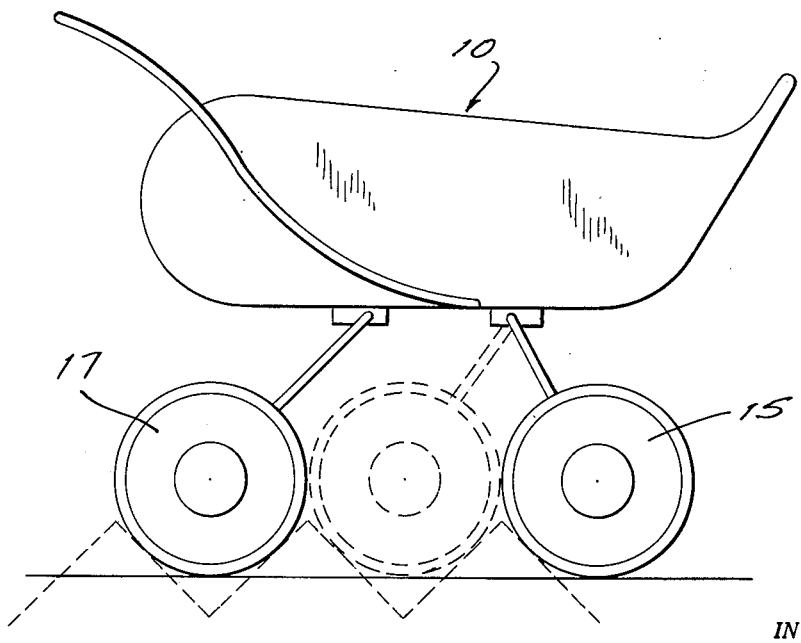
Fig. 5 is a diagrammatic side elevational view of the perambulator in upright position and illustrates the operation of the wheels on an irregular surface such as stairs.

Referring now to the drawings, it will be seen particularly from Fig. 1 that the perambulator of the invention includes a frame 10 having a pair of side bars 11 interconnected by plates 12 and 13. This frame 10 is shown in an inverted position in Fig. 1 in order to illustrate the structure of the invention in the clearest possible manner. In this specification the front of the perambulator is intended to signify the end of the perambulator distant from the operator when the perambulator is pushed by the operator. Thus, referring to Fig. 5, the front of the perambulator is the right end thereof, as viewed in Fig. 5, while the left end of the perambulator of Fig. 5 is the rear end thereof. Because of the inverted position of the perambulator of Fig. 1, the front end thereof is shown at the left of Fig. 1 while the rear end of the perambulator is shown at the right of Fig. 1. Thus, the shaft 14 of Fig. 1 turnably supports at its outer ends, in any known way, the front wheels 15 of Fig. 5, while the shaft 16 of Fig. 1 turnably supports at its outer ends, in any known way, the rear wheels 17 of Fig. 5.

This shaft 14 extends across and is carried by a pair of levers 18 each of which is pivoted at its right end, as viewed in Fig. 1, to a bracket 19 fixed to the underside of frame 10 at plate 13 thereof. Each bracket 19 is in the form of a channel member having a pair of side walls 20 interconnected by a web 21 which is directly fastened to the plate 13. Each lever 18 extends between the side walls 20 of the bracket 19 to which it is connected, and a pin 22 is fixed to each bracket, extends through the side walls thereof and through an opening in lever 18 to pivotally support the same (see Fig. 2 in particular). It will be noted that the pin 22 has a head located between the two brackets 19. A spring 23 extends from the rear edge of the plate 13 to each of the pins 22, is coiled about the latter, and then extends along the inner face of each lever 18 about an edge thereof, along the outer face thereof and is hooked about the opposite edge of the lever 18. This spring 23 is biased so as to urge the lever 18 which it engages toward the frame 10, that is, in a counterclockwise direction as viewed in Fig. 1.

An arm 24 is also pivotally connected to each of the brackets 19 and in fact is provided with an opening through which the pin 22 extends so that the arms 24 and levers 18 are turnable about a common axis. As is evident from Fig. 1, the arms 24 are respectively located opposite the levers 18. A rod 25 is pivotally connected to each of the levers 18 and extends through an opening of the opposite arm 24 so that when a lever 18 and an arm 24 opposite the same approach each other the rod 25 will move through the opening of arm 24. This rod 25 has a head end engaging each arm 24 to limit the movement of each lever 18 away from the arm 24. A coil spring 26 is located about each rod 25 and engages at one end each arm 24 and at its opposite end each lever 18, the spring 26 extending along an outer side surface of each lever 18 and being connected to the pin which pivotally supports the rod 25, for example.

The side walls 20 of each bracket 19 are formed with a pair of aligned openings 27, respectively, adjacent the front end of plate 13 and with a second pair of aligned openings 28 located to the rear of the openings 27. Also, each bracket 19 has the side walls 20 thereof formed with a third pair of aligned openings through which a portion 29 of a manually operable releasable lock member 30 extends. As is particularly evident from Fig. 2, this lock member 30 has a head end 31, and a spring 32 is coiled about portion 29 between the head end 31 and the inner side wall 20 of each bracket 19 to urge the lock members 30 inwardly. Each lock member 30 is turnable about its portion 29 and includes an elongated end portion 33 which may be selectively located either in the aligned openings 27 or in the aligned openings 28 which are equal distance from the portion 29 of member 30. When the elongated free end portions 33 of members 30 extend through the openings 27 of the brackets 19, as shown in Fig. 1, they engage an edge of the arms 24, respectively, and hold these arms locked against the plate 13 so that the arms 24 are restrained against any movement in this way. However, as is evident from Fig. 2, it is possible to pull each member 30 outwardly against the force of spring 32 to release the arm 24, and in this way the entire assembly which is pivotally supported by each pin 22 may be turned in a clockwise direction, as viewed in Fig. 3, from the position of Fig. 1 to a position where the levers 18 are both located next to the plate 13, and the lock members 30 may be turned to locate the elongated portions 33 thereon in the openings 28 of the brackets 19 to maintain the levers 18 in their position located next to the underside of frame 10. Thus, as is evident from Fig. 3, in this latter position the front wheels 15 are located much nearer to the frame of the perambulator. Of course, through the reverse of the above operations the front wheels may be returned to their operative position.

Figure 4:
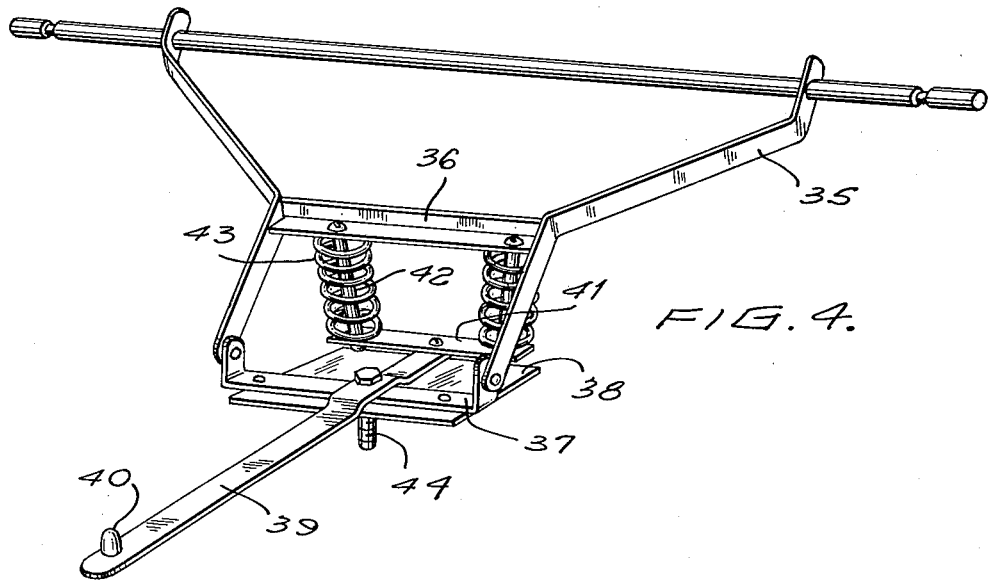
Fig. 4 is a perspective view of an assembly which carries the rear wheels of the perambulator, this assembly being shown at the right portion of Fig. 1 and enabling the perambulator to be steered easily.

The shaft 16 which carries the rear wheels 17 extends across and is carried by the pair of levers 35 which are interconnected by an angle iron 36 and which are pivoted to the bent free end portions, respectively, of a bar 37, this bar 37 being fixed to the rectangular plate 38 (Fig. 4). An arm 39 extends across bar 37, has a pin 40 fixed to and extending from its front end portion, and has a bar 41 fixed to its rear end portion. A pair of rods 42 are fixed to and extend from the bar 41 through openings in the angle iron 36, each rod 42 having enlarged ends engaging the upper face of angle iron 36, as viewed in the drawings, and a lower face of bar 41 as viewed in the drawings, respectively, so as to limit the movement of levers 35 away from the bar 41 about the pivotal connection of levers 35 to the bar 37. A pair of coil springs 43 are respectively located about the rods 42 and engage elements 36 and 41 to urge the same away from each other. A bolt 44 extends through elements 39, 37, and 38 and is fixed to the plate 12, this bolt 44 serving to mount the entire assembly of Fig. 4, which forms a support means for the rear wheels 17, for pivotal movement about the axis of the bolt 44 which in the operative position of the perambulator shown in Fig. 5 extends vertically.

As is apparent from Fig. 1, a plate 45 of substantially triangular shape is pivoted at 46 to the underside of plate 13 of the frame 10, and this plate 45 is formed with an arcuate slot 47 located along a curve whose center is in the pivot axis of the plate 45. A screw extends through the plate 13 and slot 47 and a wing nut 48 engages this screw to fix the plate 45 in a predetermined angular position on plate 13. The part of arm 39 which extends beyond pin 40 to the left, as viewed in Figs. 1 and 4, extends beneath the plate 45 and the latter is formed in its right hand edge, as viewed in Fig. 1, with a notch 49 into which the pin 40 extends in the position of the parts shown in Fig. 1. Thus, in this position of the parts the plate 45 engages the pin 40 to prevent turning of the arm 39 and the entire assembly of Fig. 4 about the axis of bolt 44, while when the wing nut 48 is loosened and the plate 45 is turned in a clockwise direction, as viewed in Fig. 1, from the position of Fig. 1, the pin 40 will be located out of engagement with the plate 45 and the assembly of Fig. 4 will then be free to turn about the axis of bolt 44.

The above-described structure operates as follows:

Assuming that the parts are in the position of Figs. 1 and 5, then the operator need only push the perambulator to the right, as viewed in Fig. 5, and the perambulator will operate as a conventional perambulator, the springs 43 acting as shock absorbers for the rear wheels 17 and the springs 26 acting as shock absorbers for the front wheels. If it is desired to execute turns with the perambulator, then the wing nut is simply loosened and the plate 45 moved away from the pin 40. Then the rear wheels 17 are free to turn about the axis of bolt 44 together with the entire assembly of Fig. 4 with respect to the frame. Thus, with this arrangement the operator need only turn the handle of the perambulator in whatever direction it is desired to turn the perambulator and the entire perambulator will turn with respect to the wheels 17 during execution of a turn after which the wheels 17 will automatically align themselves with the wheels 15 when the perambulator is moved along a straight path. The turn of the rear wheels 17 with respect to the frame 10 can be cut out at any time by returning the parts to the position shown in Fig. 1.

Assuming that the perambulator is to be moved over an irregular surface such as stairs, as indicated diagrammatically in Fig. 5, the lock members 30 are pulled out against the action of springs 32 and the elongated portions 33 thereof are located out of the aligned openings 27, with the free ends of these elongated portions abutting against the outer face of the outer walls 20 of the brackets 19. Then it is evident with the front wheels 15 engaging one of the stairs, that the entire perambulator may be moved over the front wheels so that they assume the dotted line position shown in Fig. 5 and the rear wheels 17 may be located on the next stair closely adjacent to the front wheels 15. Pushing the perambulator forwardly with respect to the front wheels when the latter engage a stair, as shown in the dotted line position of Fig. 5, causes the levers 18 and the arms 24 therewith to turn about the pins 22 against the action of the springs 23 so that the perambulator can assume the position where the front wheels are located in the dotted line position of Fig. 5 with respect to the rear wheels. Then the perambulator is tilted in a counterclockwise direction, as viewed in Fig. 5, about the wheels 17, so that the front wheels 15 are raised from the stairs, and may then snap forwardly to the solid line position of Fig. 5 under the action of the springs 23. Then the rear wheels 17 are again located on the next stair, and these operations are repeated during movement of the perambulator along stairs or the like. When again moving on a level surface the members 30 are returned to the position shown in Figs. 1 and 2 to prevent turning movement of the arms 24 with respect to the frame 10.

Figure 2:
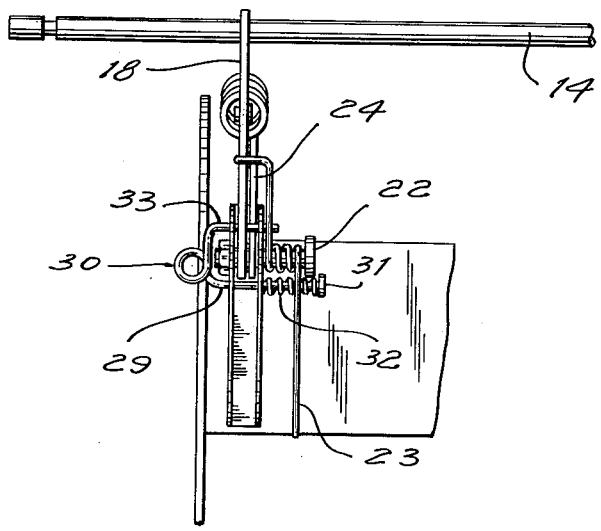
Fig. 2 is a fragmentary plan view of the structure shown in the lower left portion of Fig. 1.
Figure 3:
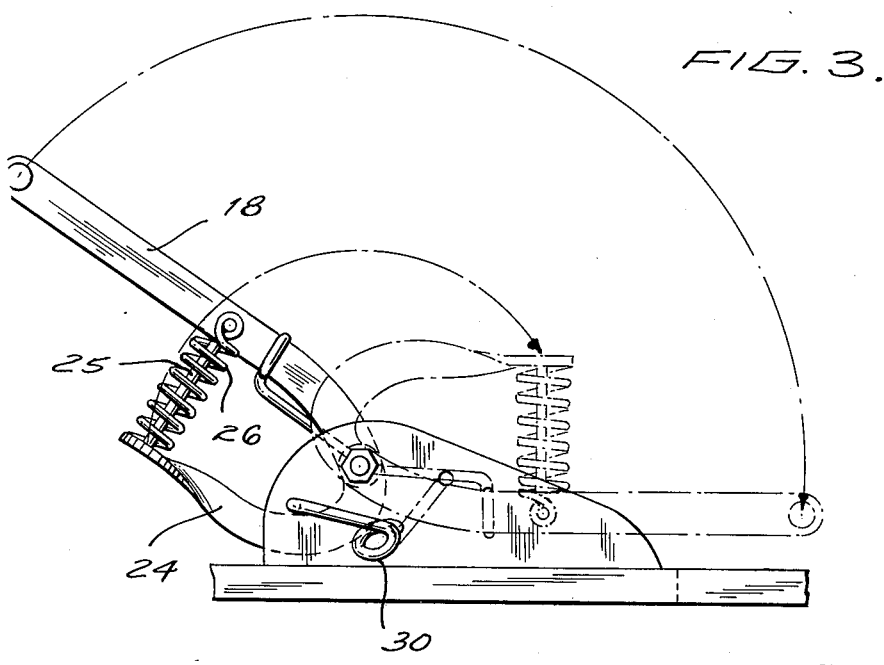
Fig. 3 is a side elevational view of the structure of Fig. 2 as seen from the left side thereof, Fig. 3 showing this structure in two different positions.

When it is desired to place the perambulator in an automobile, or the like, the lock members 30 are pulled out of the position shown in Figs. 1 and 2 to release the arms 24 and the latter together with levers 18 are turned toward the rear of the perambulator, as indicated in Fig. 3, until the levers are located directly next to the plate 13, the operator of course turning the wheels 15 and levers 18 against the action of springs 23. With the parts in this position the elongated portions 33 of the members 30 are located in the openings 28 of the brackets 19 to lock the front wheels in their position closely adjacent to the frame. With the parts in this position it is a simple matter to move the front wheels into an automobile whose floor is located above the level of the ground and then the perambulator may be tilted upwardly about the front wheels and moved into the automobile in a very simple manner. Also, it is possible, once the rear wheels engage the floor of an automobile, to turn the perambulator back about the rear wheels and locate the front wheels on the seat of an automobile so as to maintain the perambulator in a substantially horizontal position with its front wheels on the seat and the rear wheels on the floor. The perambulator may then be removed from an automobile, or the like, through the reverse of the above operations. The rear wheels may be more distant from each other than the front wheels so that the latter can move into the space between the rear wheels.

While the invention has been illustrated and described as embodied in perambulators with adjustable wheels, it is not intended to be limited to the details shown, since various modifications and structural changes may be made without departing in any way from the spirit of the present invention.

What is claimed as new and desired to be secured by Letters Patent is:

1. In a perambulator, in combination, a frame; a pair of brackets fixed to the underside of said frame adjacent one end thereof and being laterally spaced with respect to said frame; a pair of arms connected to said brackets, respectively, extending in the same direction therefrom toward said end of said frame and located next to said underside of said frame; a pair of levers respectively pivoted to said brackets, extending therefrom toward said one end of said frame and respectively located opposite said arms; a first pair of springs extending between each arm and the lever located opposite the same for resiliently limiting the movement of said lever toward said arm; a second pair of springs respectively engaging said levers for urging the same toward said arms against the action of said first pair of springs until equilibrium between said springs is obtained; and a shaft extending across and carried by said levers and adapted to carry a pair of wheels.

2. In a perambulator, in combination, a frame; a pair of brackets fixed to the underside of said frame adjacent one end thereof and being laterally spaced with respect to said frame; a pair of arms pivotally connected to said brackets, respectively, extending in the same direction therefrom toward said end of said frame and located next to said underside of said frame; releasable holding means releasably holding said arms next to said underside of said frame; a pair of levers respectively pivoted to said brackets, extending therefrom toward said one end of said frame and respectively located opposite said arms; a first pair of springs extending between each arm and the lever located opposite the same for resiliently limiting the movement of said lever toward said arm; a second pair of springs respectively engaging said levers for urging the same toward said arms against the action of said first pair of springs until equilibrium between said springs is obtained; and a shaft extending across and carried by said levers and adapted to carry a pair of wheels, whereby when said holding means is released said wheels and levers may be turned to a position closely adjacent to the underside of said frame.

3. In a perambulator, in combination, a frame; a pair of brackets fixed to the underside of said frame adjacent one end thereof and being laterally spaced with respect to said frame; a pair of arms pivotally connected to said brackets, respectively, for movement about a common axis, extending in the same direction from said brackets toward said end of said frame and located next to said underside of said frame; releasable holding means releasably holding said arms next to said underside of said frame; a pair of levers respectively pivoted to said brackets for turning movement about said common axis, also extending from said brackets toward said one end of said frame and respectively located opposite said arms; a first pair of springs extending between each arm and the lever located opposite the same for resiliently limiting the movement of said lever toward said arm; a second pair of springs respectively engaging said levers for urging the same toward said arms against the action of said first pair of springs until equilibrium between said springs is obtained; and a shaft extending across and carried by said levers and adapted to carry a pair of wheels, whereby when said holding means is released said wheels and levers may be turned to a position closely adjacent to the underside of said frame.

4. In a perambulator, in combination, a frame; a pair of brackets fixed to the underside of said frame adjacent one end thereof and being laterally spaced with respect to said frame; a pair of arms pivotally connected to said brackets, respectively, for movement about a common axis, extending in the same direction from said brackets toward said end of said frame and located next to said underside of said frame; a pair of pins movably mounted on said brackets, respectively, and engaging said arms for releasably holding the same next to said underside of said frame; a pair of levers respectively pivoted to said brackets for turning movement about said common axis, also extending from said brackets toward said one end of said frame and respectively located opposite said arms; a first pair of springs extending between each arm and the lever located opposite the same for resiliently limiting the movement of said lever toward said arm; a second pair of springs respectively engaging said levers for urging the same toward said arms against the action of said first pair of springs until equilibrium between said springs is obtained; and a shaft extending across and carried by said levers and adapted to carry a pair of wheels, said brackets being formed with openings located respectively adjacent said levers when the latter are in their position adjacent said underside of said frame and adapted to receive said pins after release of said arms and movement of said levers to said position, so that said pins then hold said levers next to said underside of said frame.

References Cited in the file of this patent

UNITED STATES PATENTS

| | | |
|---|---|---|
| 857,696 | Weinstein | June 25, 1907 |
| 1,192,002 | Schiller | July 25, 1916 |
| 2,471,985 | Troendle | May 31, 1949 |
| 2,525,924 | Margiloff | Oct. 17, 1950 |
| 2,589,679 | Dennesen | Mar. 18, 1952 |
| 2,626,162 | Erwin | Jan. 20, 1953 |

FOREIGN PATENTS

| | | |
|---|---|---|
| 166,141 | Austria | June 10, 1950 |
| 952,844 | France | May 9, 1949 |